June 13, 1967 R. J. VOSS 3,324,991
CONVEYOR BELTS
Filed Aug. 18, 1965
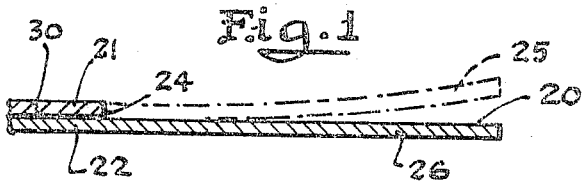
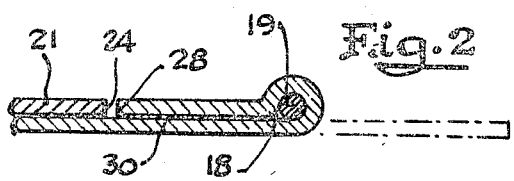
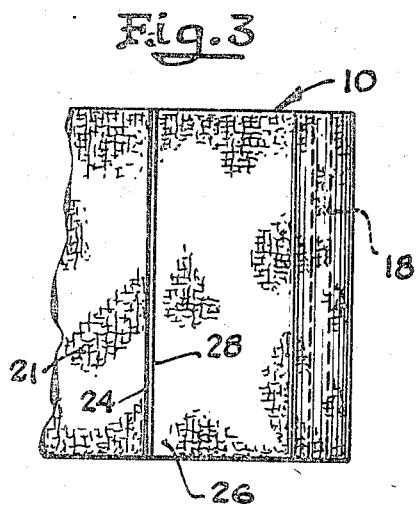
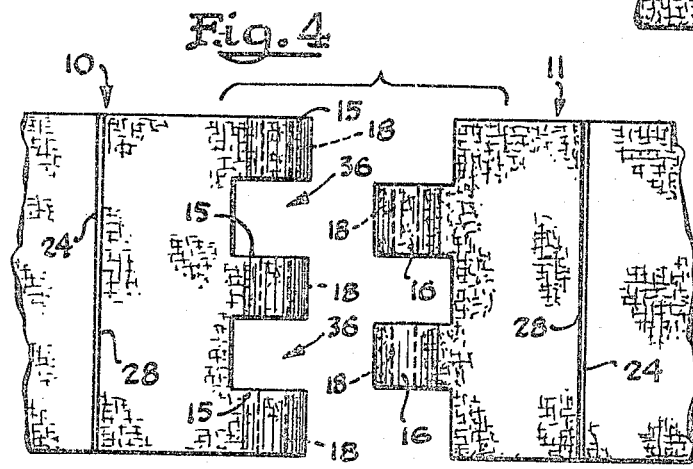
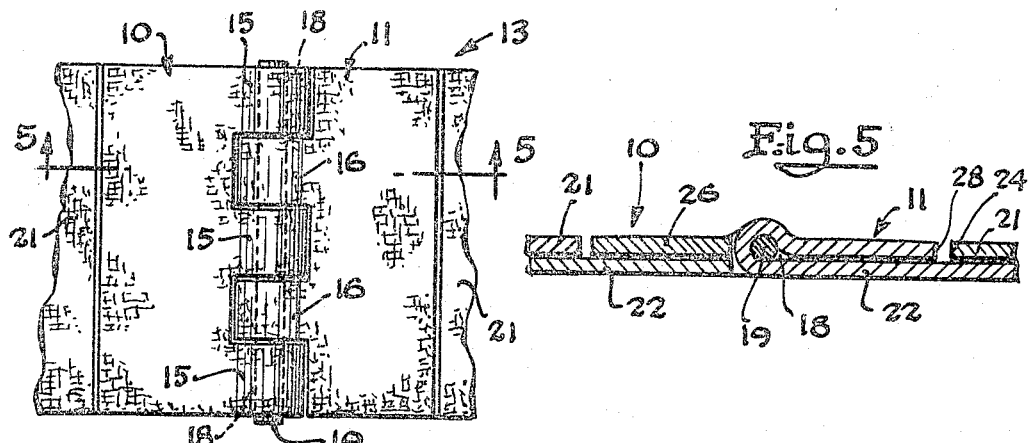
Inventor
Robert J. Voss
By Wallace, Kinzer and Dorn
Attorneys

United States Patent Office 3,324,991
Patented June 13, 1967

3,324,991
CONVEYOR BELTS
Robert J. Voss, Chicago, Ill., assignor to Voss Belting & Specialty Co., Lincolnwood, Ill., a corporation of Illinois
Filed Aug. 18, 1965, Ser. No. 480,743
3 Claims. (Cl. 198—193)

This invention relates to conveyor belts and more particularly to hinge connections between adjacent ends thereof.

The present invention is directed to a joint or hinge construction between two ends of a conveyor belt having interfitted loop portions through which is inserted a retaining pin or key; and accordingly, the primary object of the present invention is a novel method of making a strong and satisfactory hinge construction of the foregoing description.

The present invention is of particular utility in the making of hinge connections for endless conveyor belts of light-weight construction and to endless belts wherein the clearance or tolerance requirements for the thickness of the hinge connection are subject to rigid specifications. For example, the present invention is of particular utility in the formation of hinge connections for light-weight conveyor belts such as used for feeding sheets of paper in dry heating machines or the like. In such an environment, it is necessary that the joint connection between belt ends be relatively thin or flat to avoid interference with the other operating instrumentalities or improper sheet feeding.

Thus, an object of the invention is to reduce the thickness of the joint connection in a conveyor, feed or drive belt by removing a portion of the belt material and folding the remaining portion back upon itself to form a loop adapted to receive the retaining key whereby the thickness of the material adjacent the loop is approximately the same thickness as the belting material.

A more specific and further object of the invention is to make a customized fit between the loops formed in the interfitted portions of the belt ends by forming loops about a connecting pin or key and vulcanizing the loop forming belt material about the pin.

Other and further objects of the present invention will be apparent from the following description and claims and are illustrated in the accompanying drawings which, by way of illustration shows a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a cross-sectional view showing the splitting of a belt end;

FIG. 2 is a sectional view illustrating the folding of a split end portion about a retaining pin;

FIG. 3 is a plan view showing the pin withdrawn from the loop after vulcanizing the split end portion to itself;

FIG. 4 is a plan view showing a pair of belts having interfitting portions formed therein;

FIG. 5 is a cross-sectional view showing belt ends secured by a retaining pin; and FIG. 6 is a plan view of the belt ends of FIG. 5.

The present invention is directed to the manner of making a hinge construction between adjacent ends 10 and 11, FIG. 6, of a conveyor belt 13. The belt ends 10 and 11 are the opposite ends of an endless belt 13 formed when the ends 10 and 11 are joined together, FIG. 6. The hinge connection includes interfitting portions 15 and 16 on the respective belt ends 10 and 11, which are adapted for mating engagement with one another to align respective loops or openings 18, FIG. 4, for receiving a retaining means in the form of a retaining key or pin 19. Manifestly, the retaining pin 19 may have other configurations than that of the circular cross-section pin illustrated in the preferred embodiment of the invention.

The present invention is of particular utility in affording a relatively flat hinge connection having approximately the same thickness as the thickness of the belt material. To this end, it is preferred that the belt 13 be split along a generally central plane 20, FIG. 1. The belt 13 illustrated in FIGS. 1, 2, and 3, is preferably a two-ply material having a first ply 21 and a second ply 22, which are bonded by a conventional rubber-resin adhesive or cement 30 which when vulcanized adheres the plies or layers 21 and 22 to one another. The ply material is preferably cotton webbing or any preferred synthetic material.

The first step in forming the hinge connection is to split the belt ends 10 and 11 along the central planes 20 rearwardly to form a top split portion 25 and a lower split portion 26, FIG. 1. One of the split portions is severed, as at the shoulder 24, FIG. 2.

The remaining split portion 26 is then folded back upon itself with its outer free end 28 brought adjacent to the shoulder 24. The retaining pin 19 is disposed within the now formed loop 18.

Additional bonding cement of a conventional and any preferred character 30 is disposed between the end 28 of the lower portion of the split portion 26 disposed thereabeneath, as seen in FIG. 2. The superimposed portions are subjected to a conventional vulcanizing operation whereby the loop 18 is formed in the belt end 10. In the same manner, the belt end 11 is split, one split end removed, the other split end folded about the pin 19 and vulcanized to form the loop 18. The forming of the loop 18 with the pin 19 therein assures a customized fit for the pin 19 when the pin 19 is inserted to interconnect the belt ends 10 and 11, as seen in FIGS. 5 and 6.

As seen in FIGS. 2 and 5, the belt ends 10 and 11 are formed with only two plys which together are approximately the same thickness of the belt.

After removal of the pin 19, FIG. 3, the loops 18 of the belt ends 10 and 11 are formed respectively with the interfitting portions 15 and 16, FIG. 4, by stamping or shearing within a cutting press or the like. Thus, the belt end 11 is cut or stamped to form complementary projections 16 for fitting within the spaces 36 between interfitting projections 15 of the belt end 10. The interfitting portions 15 and 16 constitute knuckles which are adapted to be interleaved with one another.

To assemble the hinge connection between the belt ends 10 and 11, these belt ends are brought together with the interfitting portions 15 and 16 and are disposed together, FIG. 6, with their respective loop portions 18 aligned to receive the pin 19. Then the pin 19 is inserted through the aligned loops 18 to lock the belt ends 10 and 11 together. The tight customized fit of the pin 19 in the holes or loops 18 renders unnecessary the use of any fasteners on the ends of the pin 19 to prevent its lateral sliding from its interlocking position in the belt ends 10 and 11. Thus, a simple wire-like element may be used as the pin 19 without any fasteners on the pin 19.

It will be seen from the foregoing, that the present invention affords a novel and relatively thin hinge connection and produces a hinge connection by an inexpensive and simple method readily adapted for large production manufacturing operations.

Hence, while the preferred embodiment of the invention has been described and illustrated, it is to be understood that this is capable of variation and modification.

I claim:

1. The method of forming a hinge joint for adjacent ends of a multiple-ply conveyor belt connected by a retaining means at the hinge and comprising the steps of: splitting the ends of the belt to sever a portion of one ply, removing the severed ply portions from each severed end of the belt, disposing a retaining means on each of the remaining ply portions, folding back part of said remaining ply portions over said retaining means, bonding each of said folded back parts to the underlying remaining ply portions with said retaining means, in situ, to form a loop, removing said retaining means from each loop, notching said loops to form interfitting loop portions, bringing said interfitting loop portions into alignment, and inserting a retainer means through said interfitted loop portions to lock said adjacent belt ends together.

2. The method of forming a hinge joint for adjacent ends of a multiple-ply conveyor belt connected by a retaining means at the hinge and comprising the steps of: splitting the ends of the belt to sever a portion of one ply while leaving an exposed portion of the remaining ply, removing the severed ply portions from each end of the belt, folding back on itself a part of each of said remaining ply portions, bonding each of said folded back parts to its underlying remaining ply portion to form a loop, and notching said loops to form complemental interfitting hinge loop portions for receiving a retainer pin passed through said interfitted loop portions when aligned to lock said adjacent belt ends together.

3. A method according to claim 2 wherein the belt is of two-ply thickness, the severed portion leaving a shoulder (24), the free end (28) of the remaining folded-back ply being brought substantially into abutting relation to said shoulder prior to bonding.

References Cited

UNITED STATES PATENTS 2,916,136  12/1959  Combs _____ 24—33 X

EVON C. BLUNK, *Primary Examiner.*

A. C. HODGSON, *Assistant Examiner.*